US012627059B2

(12) United States Patent
Jan et al.

(10) Patent No.: US 12,627,059 B2
(45) Date of Patent: May 12, 2026

(54) ANTENNA STRUCTURE AND COMMUNICATION DEVICE

(71) Applicant: Wistron NeWeb Corp., Hsinchu (TW)

(72) Inventors: Cheng-Geng Jan, Hsinchu (TW); Chieh-Sheng Hsu, Hsinchu (TW); Tsung-Hsing Tsai, Hsinchu (TW)

(73) Assignee: WISTRON NEWEB CORP., Hsinchu (TW)

( * ) Notice: Subject to any disclaimer, the term of this patent is extended or adjusted under 35 U.S.C. 154(b) by 310 days.

(21) Appl. No.: 18/487,309

(22) Filed: Oct. 16, 2023

(65) Prior Publication Data

US 2024/0154313 A1 May 9, 2024

(30) Foreign Application Priority Data

Nov. 3, 2022 (TW) ................................. 111141939

(51) Int. Cl.

*H01Q 1/24* (2006.01)
*H01Q 9/04* (2006.01)
*H01Q 21/06* (2006.01)

(52) U.S. Cl.

CPC ......... *H01Q 9/0435* (2013.01); *H01Q 21/065* (2013.01)

(58) Field of Classification Search

CPC ...... H01Q 9/0435; H01Q 21/065; H01Q 1/02; H01Q 5/321; H01Q 9/285; H01Q 21/28; H01Q 1/246; H01Q 5/371; H01Q 21/205

See application file for complete search history.

(56) References Cited

U.S. PATENT DOCUMENTS

| | | | | |
|---|---|---|---|---|
| 10,965,266 B1 * | 3/2021 | Xie | .......................... | H01Q 1/02 |
| 2013/0082898 A1 | 4/2013 | Asanuma et al. | | |
| 2020/0021009 A1 * | 1/2020 | Huang | ..................... | H01Q 9/42 |
| 2020/0185813 A1 * | 6/2020 | Chang | ...................... | H01Q 1/48 |

* cited by examiner

*Primary Examiner* — David E Lotter

(74) *Attorney, Agent, or Firm* — McClure, Qualey & Rodack, LLP

(57) ABSTRACT

An antenna structure includes a first radiation element, a second radiation element, a third radiation element, an inductor, and a dielectric substrate. The first radiation element has a first feeding point. The second radiation element has a second feeding point. The second radiation element is adjacent to the first radiation element. The third radiation element is coupled through the inductor to the second radiation element. The first radiation element, the second radiation element, and the third radiation element are all disposed on the dielectric substrate.

19 Claims, 10 Drawing Sheets

500

ANTENNA STRUCTURE AND COMMUNICATION DEVICE

CROSS REFERENCE TO RELATED APPLICATIONS

This application claims priority of Taiwan Patent Application No. 111141939 filed on Nov. 3, 2022, the entirety of which is incorporated by reference herein.

BACKGROUND OF THE INVENTION

Field of the Invention

The disclosure generally relates to an antenna structure, and more particularly, to a wideband antenna structure.

Description of the Related Art

With the advancements being made in mobile communication technology, mobile devices such as portable computers, mobile phones, multimedia players, and other hybrid functional portable electronic devices have become more common. To satisfy consumer demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi systems and using frequency bands of 2.4 GHz, 5.2 GHz, and 5.8 GHz.

Antennas are indispensable elements for wireless communication. If an antenna used for signal reception and transmission has insufficient bandwidth, it will negatively affect the communication quality of the mobile device in which it is installed. Accordingly, it has become a critical challenge for designers to design a wideband antenna structure that is small in size.

BRIEF SUMMARY OF THE INVENTION

In an exemplary embodiment, the invention is directed to an antenna structure that includes a first radiation element, a second radiation element, a third radiation element, an inductor, and a dielectric substrate. The first radiation element has a first feeding point. The second radiation element has a second feeding point. The second radiation element is adjacent to the first radiation element. The third radiation element is coupled through the inductor to the second radiation element. The first radiation element, the second radiation element, and the third radiation element are all disposed on the dielectric substrate.

In another exemplary embodiment, the invention is directed to a communication device that includes a motherboard, a cooling fin, and an antenna system. The cooling fin is coupled to the motherboard. The antenna system includes a plurality of antenna structures. The motherboard and the cooling fin are substantially surrounded by the antenna structures. Each of the antenna structures includes a first radiation element, a second radiation element, a third radiation element, an inductor, and a dielectric substrate. The first radiation element has a first feeding point. The second radiation element has a second feeding point. The second radiation element is adjacent to the first radiation element. The third radiation element is coupled through the inductor to the second radiation element. The first radiation element, the second radiation element, and the third radiation element are all disposed on the dielectric substrate.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1A:
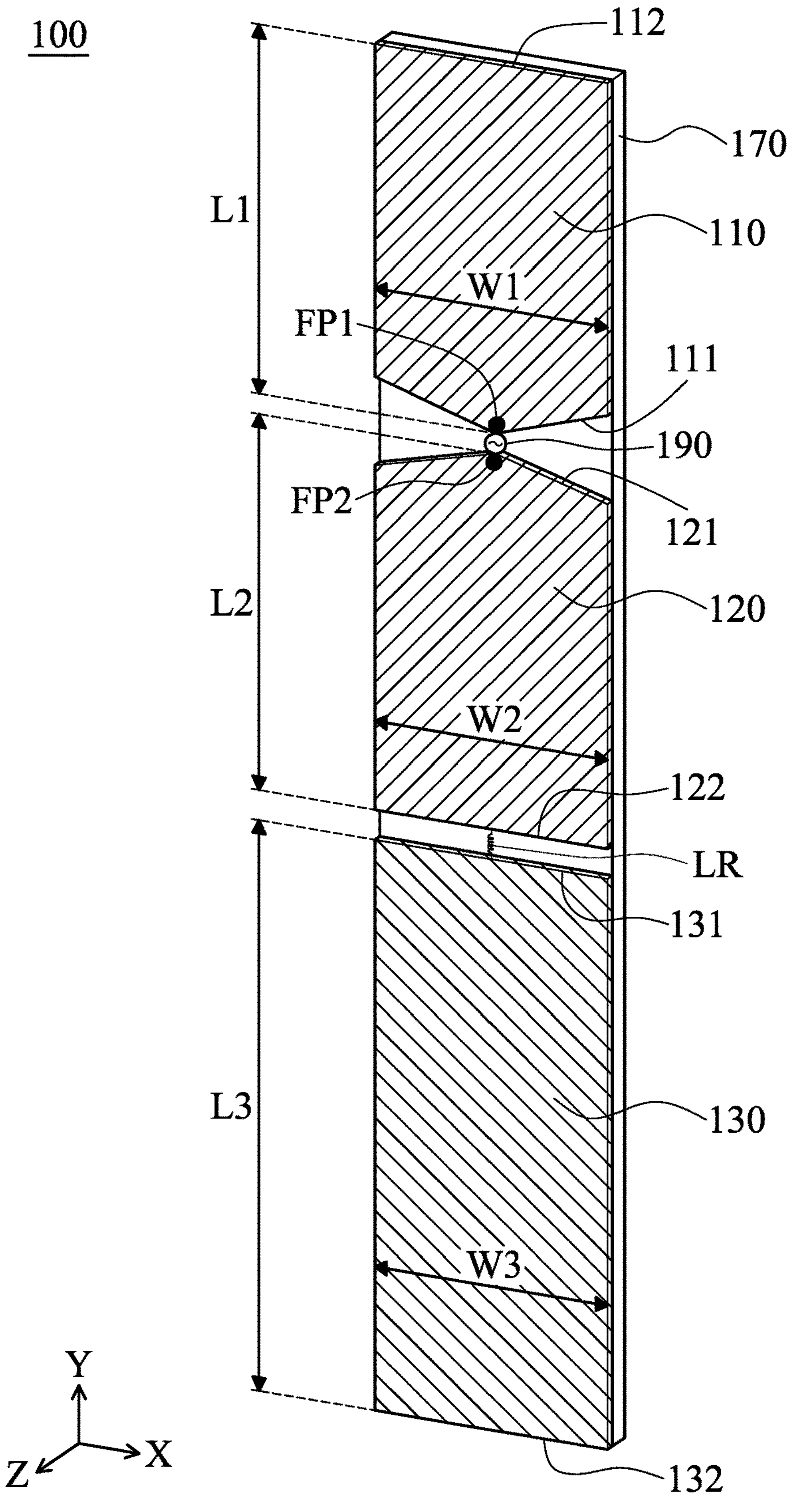
FIG. 1A is a perspective view of an antenna structure according to an embodiment of the invention.

In order to illustrate the purposes, features and advantages of the invention, the embodiments and figures of the invention are shown in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
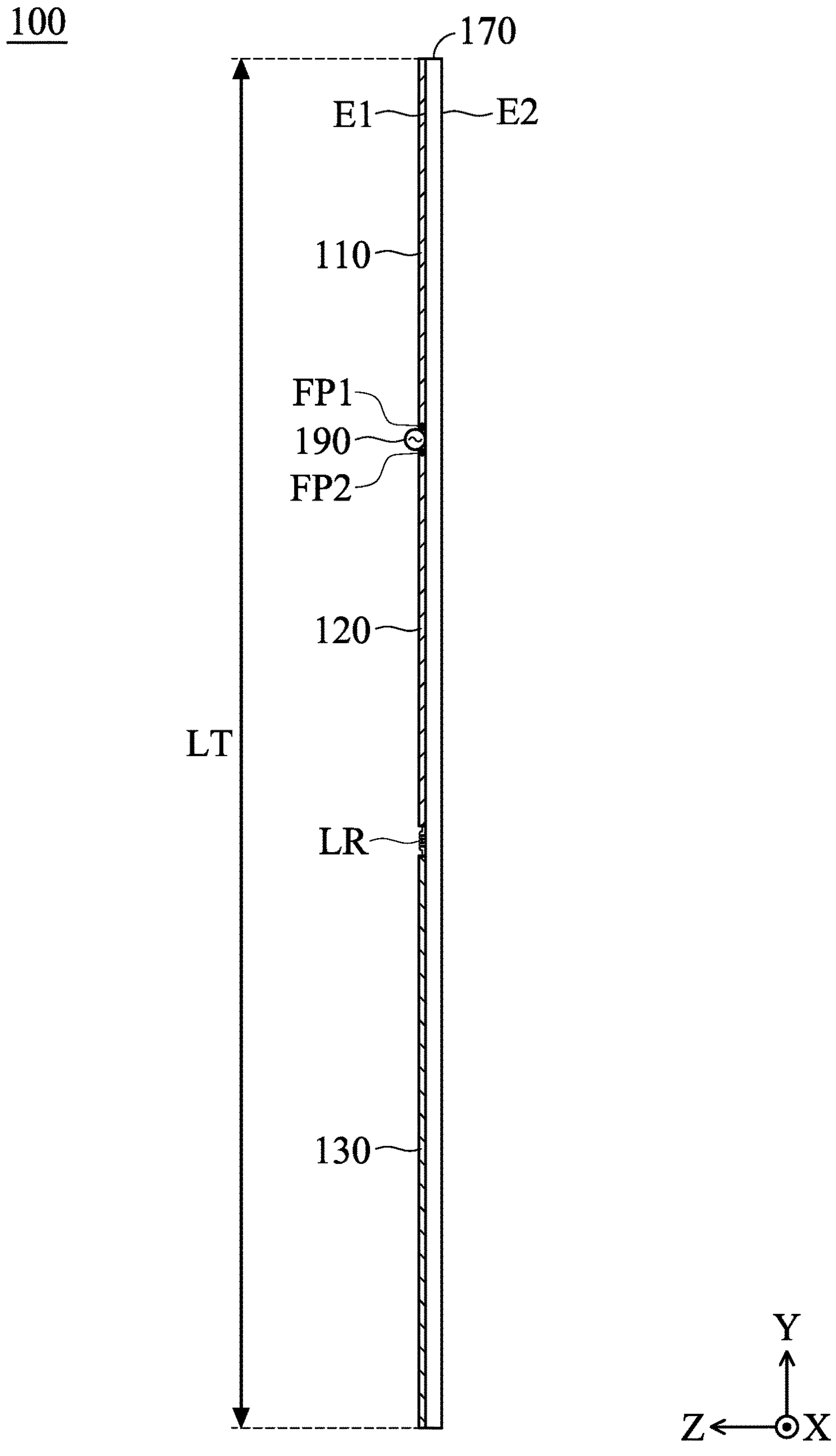
FIG. 1B is a side view of an antenna structure according to an embodiment of the invention.

FIG. 1A is a perspective view of an antenna structure 100 according to an embodiment of the invention. FIG. 1B is a side view of the antenna structure 100 according to an embodiment of the invention. Please refer to FIG. 1A and FIG. 1B together. For example, the antenna structure 100 may be applied in a communication device or a wireless access point, but it is not limited thereto. In the embodiment of FIG. 1A and FIG. 1B, the antenna structure 100 at least includes a first radiation element 110, a second radiation element 120, a third radiation element 130, an inductor LR, and a dielectric substrate 170. The first radiation element 110, the second radiation element 120, and the third radiation element 130 may all be made of metal materials, such as copper, silver, aluminum, iron, or their alloys.

The first radiation element 110 may substantially have a pentagonal shape. Specifically, the first radiation element 110 has a first end 111 and a second end 112. A first feeding point FP1 is positioned at the first end 111 of the first radiation element 110. The second end 112 of the first radiation element 110 is an open end. To fine-tune the impedance matching of the antenna structure 100, the first end 111 of the first radiation element 110 may substantially have a tapered shape. The first feeding point FP1 may be positioned at the vertex of the above tapered shape.

The second radiation element 120 may substantially have another pentagonal shape. The second radiation element 120 is adjacent to the first radiation element 110. Specifically, the second radiation element 120 has a first end 121 and a second end 122. A second feeding point FP2 is positioned at the first end 121 of the second radiation element 120. To fine-tune the impedance matching of the antenna structure 100, the first end 121 of the second radiation element 120 may substantially have another tapered shape. The second feeding point FP2 may be positioned at the vertex of the above tapered shape. In some embodiments, the first feeding point FP1 is further coupled to the positive electrode of a signal source 190, and the second feeding point FP2 is further coupled to the negative electrode of the signal source 190. For example, the aforementioned signal source 190 may be an RF (Radio Frequency) module for exciting the antenna structure 100. In alternative embodiments, the positive electrode and the negative electrode of the signal source 190 are exchanged with each other. It should be noted that the term "adjacent" or "close" over the disclosure means that the distance (spacing) between two corresponding elements is smaller than a predetermined distance (e.g., 10 mm or the shorter), but often does not mean that the two corresponding elements directly touch each other (i.e., the aforementioned distance/spacing between them is reduced to 0).

The inductor LR may be a lumped inductor. In some embodiments, the inductor LR is formed on the dielectric substrate 170 by using SMT (Surface Mount Technology), but it is not limited thereto.

The third radiation element 130 may substantially have a rectangular shape. Specifically, the third radiation element 130 has a first end 131 and a second end 132. The first end 131 of the third radiation element 130 is coupled through the inductor LR to the second end 122 of the second radiation element 120. The second end 132 of the third radiation element 130 is an open end. For example, the second end 132 of the third radiation element 130 and the second end 112 of the first radiation element 110 may substantially extend in opposite directions and away from each other. In some embodiments, the width W3 of the third radiation element 130 is greater than or equal to the width W2 of the second radiation element 120, so as to increase the operational bandwidth of the antenna structure 100.

The dielectric substrate 170 may be an FR4 (Flame Retardant 4) substrate, a PCB (Printed Circuit Board), or an FPC (Flexible Printed Circuit). Specifically, the dielectric substrate 170 has a first surface E1 and a second surface E2 which are opposite to each other. The first radiation element 110, the second radiation element 120, the third radiation element 130, and the inductor LR are all disposed on the first surface E1 of the dielectric substrate 170. No radiation element is disposed on the second surface E2 of the dielectric substrate 170.

Figure 2:
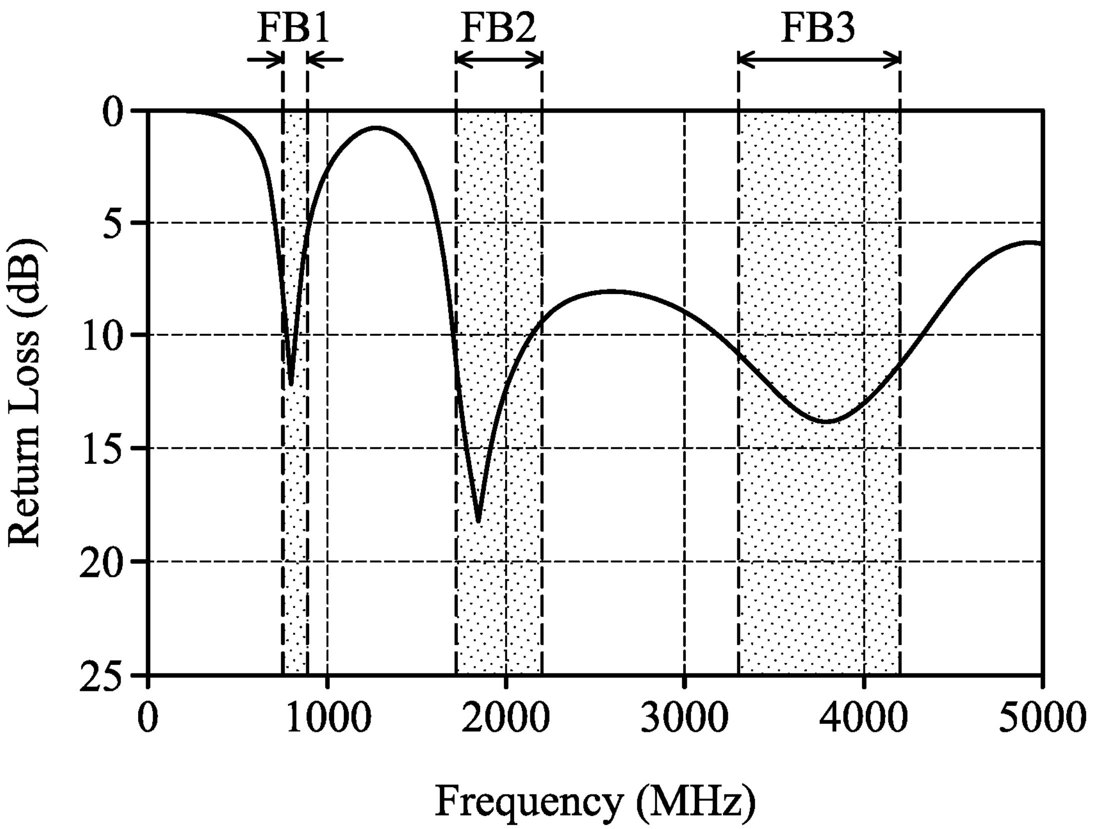
FIG. 2 is a diagram of return loss of an antenna structure according to an embodiment of the invention.

FIG. 2 is a diagram of return loss of the antenna structure 100 according to an embodiment of the invention. The horizontal axis represents the operational frequency (MHz), and the vertical axis represents the return loss (dB). According to the measurement of FIG. 2, the antenna structure 100 can cover a first frequency band FB1, a second frequency band FB2, and a third frequency band FB3. For example, the first frequency band FB1 may be from 746 MHz to 894 MHz, the second frequency band FB2 may be from 1710 MHz to 2200 MHz, and the third frequency band FB3 may be from 3300 MHz to 4200 MHz. Therefore, the antenna structure 100 can support at least the sub-6 GHz wideband operations of and the next 5G (5th Generation Wireless System) communication.

In some embodiments, the operational principles of the antenna structure 100 will be described as follows. The first radiation element 110, the second radiation element 120, and the third radiation element 130 are excited to generate the first frequency band FB1. It should be noted that the inductor LR is considered as a short-circuited element within the first frequency band FB1 since the first frequency band FB1 is relatively low. The first radiation element 110 and the second radiation element 120 are excited to generate a fundamental resonant mode, thereby forming the second frequency band FB2. In addition, the first radiation element 110 and the second radiation element 120 are further excited to generate a higher-order resonant mode, thereby forming the third frequency band FB3. It should be noted that the inductor LR is considered as an open-circuited element within the second frequency band FB2 and the third frequency band FB3 since the second frequency band FB2 and the third frequency band FB3 are relatively high. By using the inductor LR, the third radiation element 130 is selectively used as a partial resonant path of the antenna structure 100. Therefore, the total size of the antenna structure 100 can be significantly reduced.

Figure 3A:
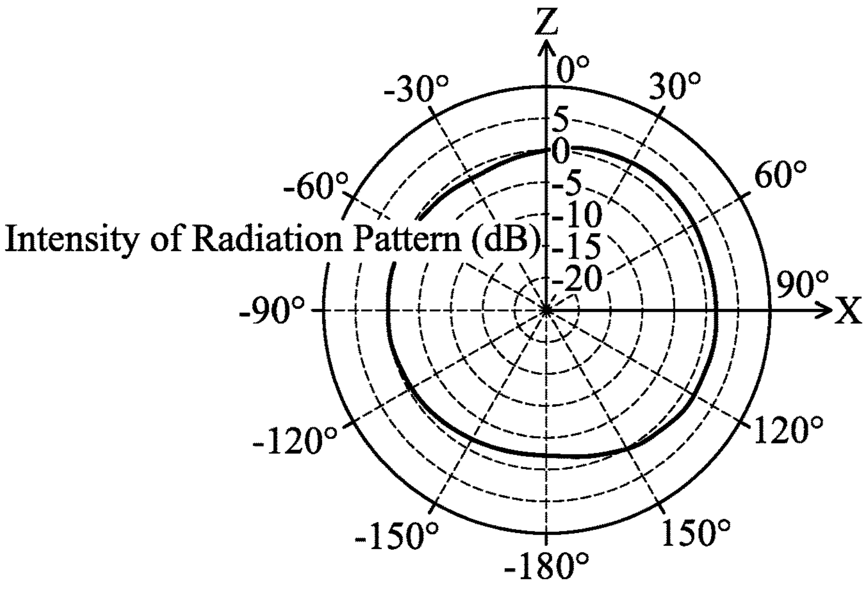
FIG. 3A is a radiation pattern of an antenna structure operating in a first frequency band according to an embodiment of the invention.

FIG. 3A is a radiation pattern of the antenna structure 100 operating in the first frequency band FB1 according to an embodiment of the invention. It should be understood that the aforementioned radiation pattern is shown by a polar coordinate system. The parameter "ψ" of the polar coordinate system represents the spatial azimuth angle (degree) on the horizontal plane (ZX plane). The parameter "R" of the polar coordinate system represents the radiation gain (dB) of the antenna structure 100. According to the measurement of FIG. 3A, the antenna structure 100 can provide an almost omnidirectional radiation pattern within the first frequency band FB1.

Figure 3B:
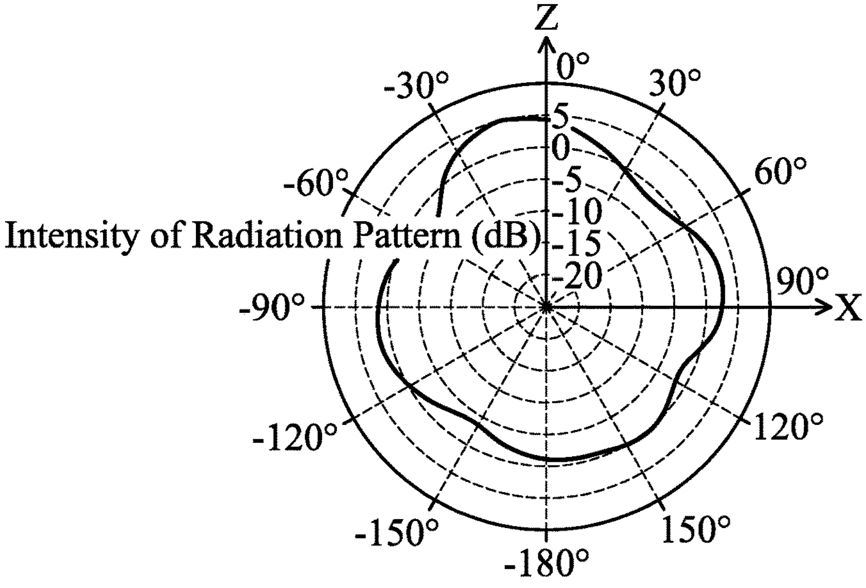
FIG. 3B is a radiation pattern of an antenna structure operating in a second frequency band according to an embodiment of the invention.

FIG. 3B is a radiation pattern of the antenna structure 100 operating in the second frequency band FB2 according to an embodiment of the invention. According to the measurement of FIG. 3B, the antenna structure 100 can provide an almost omnidirectional radiation pattern within the second frequency band FB2.

Figure 3C:
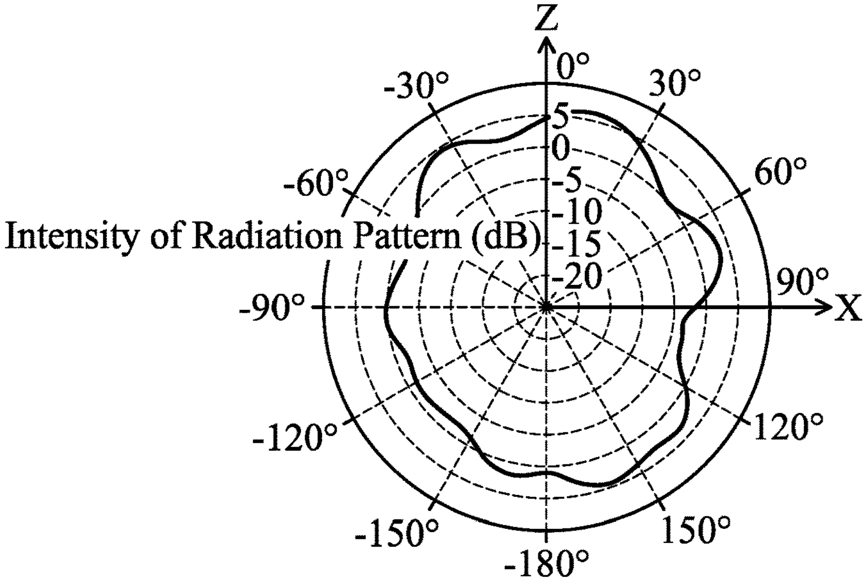
FIG. 3C is a radiation pattern of an antenna structure operating in a third frequency band according to an embodiment of the invention.

FIG. 3C is a radiation pattern of the antenna structure 100 operating in the third frequency band FB3 according to an embodiment of the invention. According to the measurement of FIG. 3C, the antenna structure 100 can provide an almost omnidirectional radiation pattern within the third frequency band FB3.

In some embodiments, the element sizes and parameters of the antenna structure 100 will be described as follows. The length L1 of the first radiation element 110 may be substantially equal to 0.25 wavelength (λ/4) of the second frequency band FB2 of the antenna structure 100. The width W1 of the first radiation element 110 may be from 27 mm to 33 mm. The length L2 of the second radiation element 120 may be substantially equal to 0.25 wavelength (λ/4) of the second frequency band FB2 of the antenna structure 100. The width W2 of the second radiation element 120 may be from 27 mm to 33 mm. The total length (L2+L3) of the second radiation element 120 and the third radiation element 130 may be substantially equal to 0.25 wavelength (λ/4) of the first frequency band FB1 of the antenna structure 100. The width W3 of the third radiation element 130 may be from 27 mm to 40 mm. The inductance of the inductor LR may be from 4 nH to 6 nH. The total length LT of the antenna structure 100 may be from 130 mm to 140 mm, and it can be reduced by at least 30% in comparison to the conventional design (the total length of the conventional design is usually longer than 200 mm). The above ranges of element sizes and parameters are calculated and obtained according to many experiment results, and they help to optimize the operational bandwidth and impedance matching of the antenna structure 100.

The following embodiments will introduce different configurations and detailed structural features of the antenna structure 100. It should be understood that these figures and descriptions are merely exemplary, rather than limitations of the invention.

Figure 4:
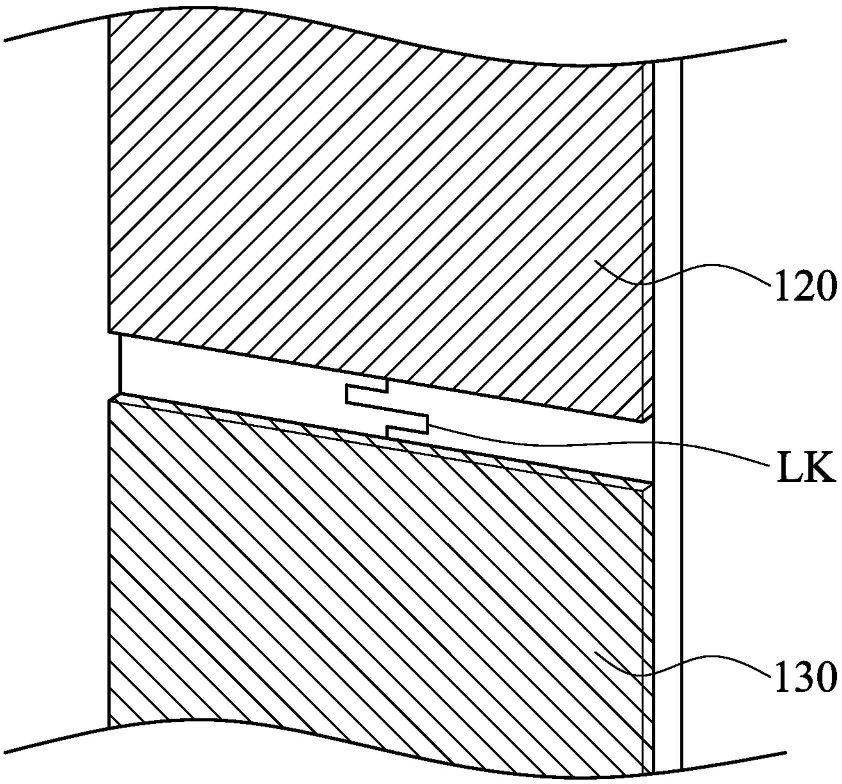
FIG. 4 is a perspective view of an inductor according to an embodiment of the invention.

FIG. 4 is a perspective view of an inductor LK according to an embodiment of the invention. In the embodiment of FIG. 4, the inductor LK is a choke line inductor, which may be coupled between the second radiation element 120 and the third radiation element 130 as mentioned above. According to practical measurements, if the lumped inductor LR is replaced with the choke line inductor LK, the operational characteristics of the antenna structure 100 will not be affected so much.

Figure 5:
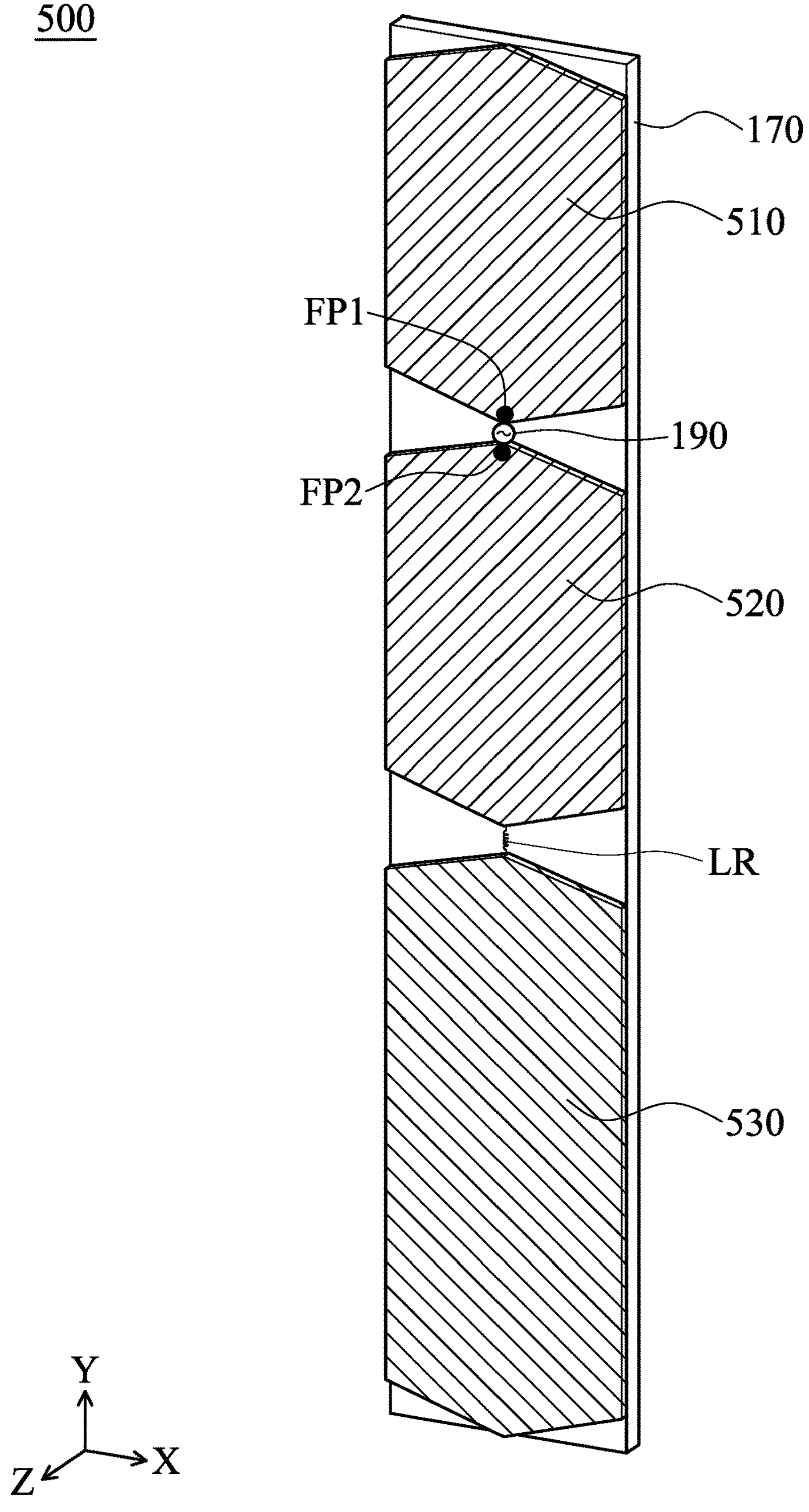
FIG. 5 is a perspective view of an antenna structure according to an embodiment of the invention.

FIG. 5 is a perspective view of an antenna structure 500 according to an embodiment of the invention. FIG. 5 is similar to FIG. 1A. In the embodiment of FIG. 5, a first radiation element 510, a second radiation element 520, and a third radiation element 530 of the antenna structure 500 each substantially have a hexagonal shape. According to practical measurements, such a tapered edge design of each radiation element can help to fine-tune the impedance matching of the antenna structure 500. Other features of the antenna structure 500 of FIG. 5 are similar to those of the antenna structure 100 of FIG. 1A and FIG. 1B. Accordingly, the two embodiments can achieve similar levels of performance.

Figure 6:
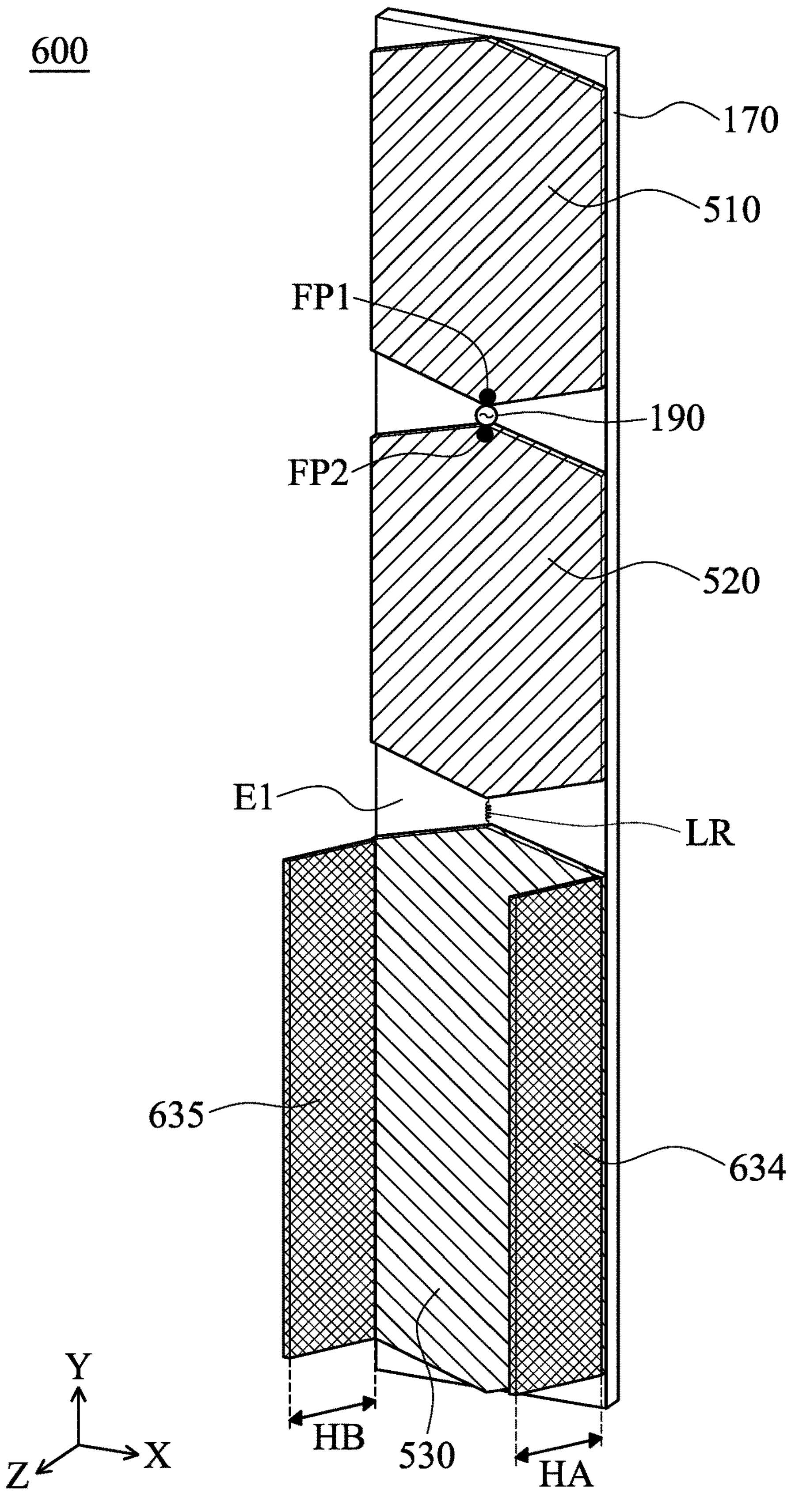
FIG. 6 is a perspective view of an antenna structure according to an embodiment of the invention.

FIG. 6 is a perspective view of an antenna structure 600 according to an embodiment of the invention. FIG. 6 is similar to FIG. 5. In the embodiment of FIG. 6, the antenna structure 600 further includes a first extension radiation element 634 and a second extension radiation element 635, which may be made of metal materials. Specifically, the first extension radiation element 634 is coupled to one side of the third radiation element 530, and the second extension radiation element 635 is coupled to the opposite side of the third radiation element 530. The second extension radiation element 635 may be substantially parallel to the first extension radiation element 634. In addition, both the first extension radiation element 634 and the second extension radiation element 635 may be substantially perpendicular to the first surface E1 of the dielectric substrate 170. For example, the height HA of the first extension radiation element 634 (along the direction of Z-axis) may be from 8 mm to 12 mm, and the height HB of the second extension radiation element 635 (along the direction of Z-axis) may also be from 8 mm to 12 mm, but they are not limited thereto. According to practical measurements, such a design of each extension radiation element can help to increase the operational bandwidth of the antenna structure 600. Other features of the antenna structure 600 of FIG. 6 are similar to those of the antenna structure 500 of FIG. 5. Accordingly, the two embodiments can achieve similar levels of performance.

Figure 7A:
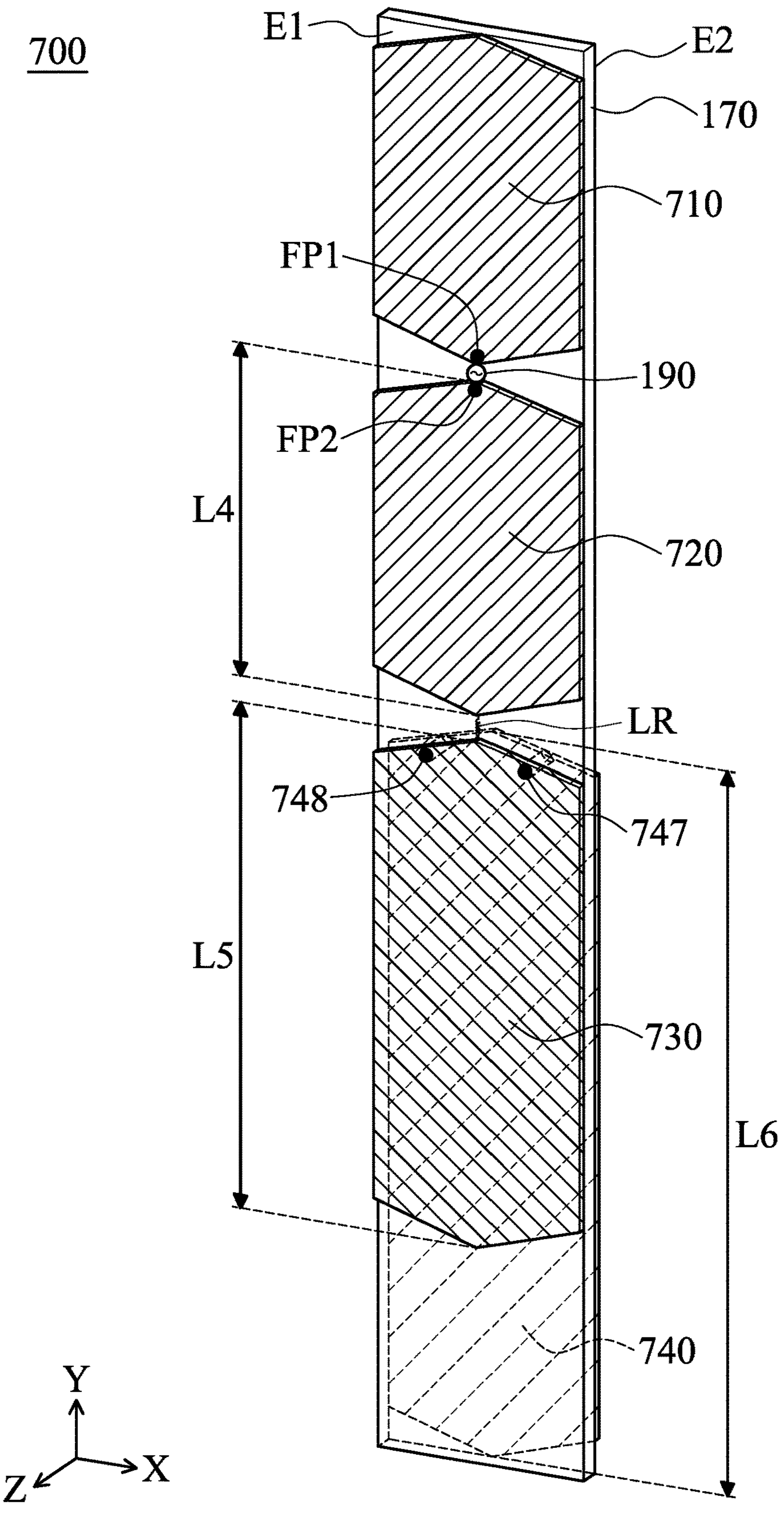
FIG. 7A is a perspective view of an antenna structure according to an embodiment of the invention.
Figure 7B:
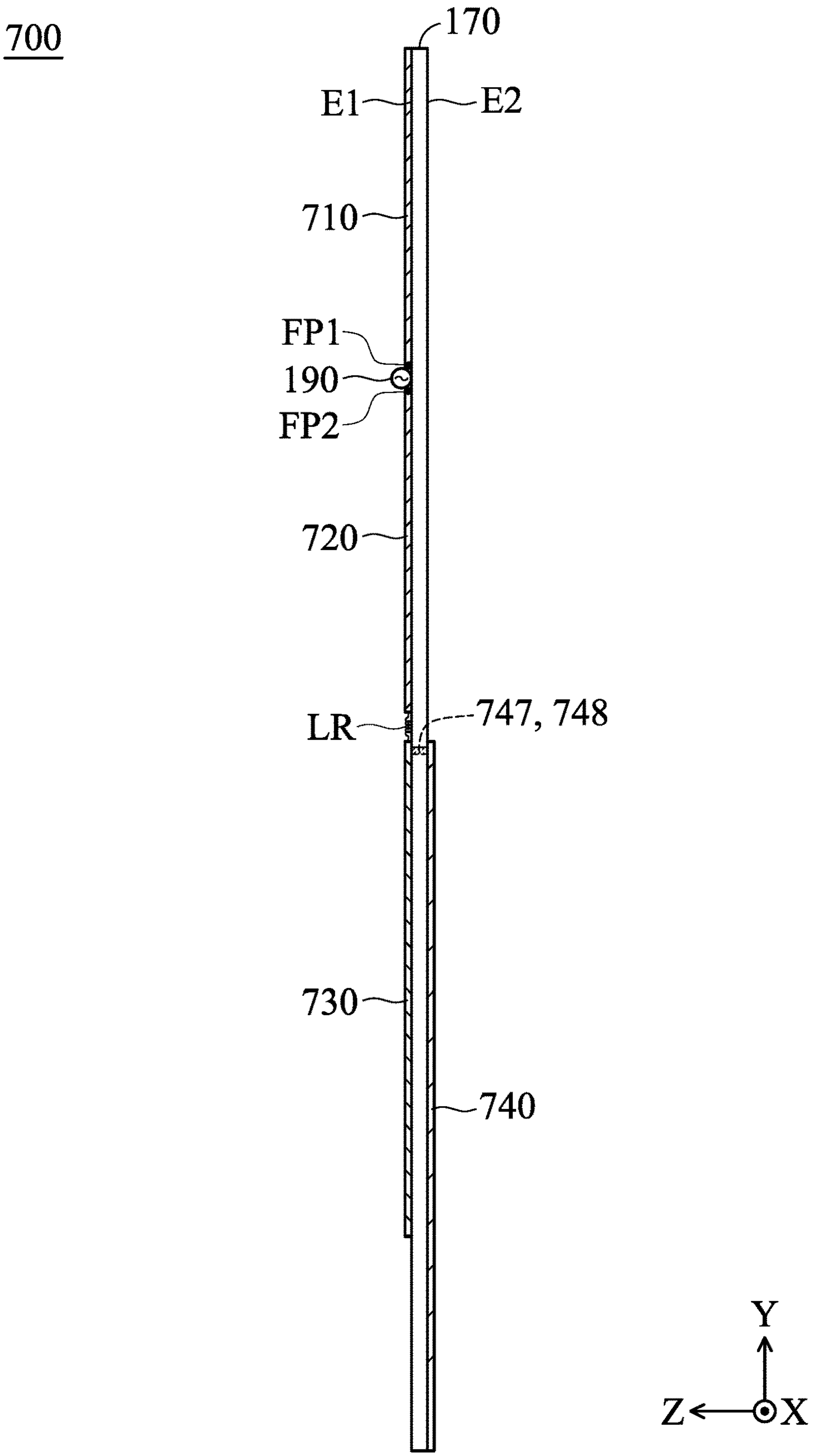
FIG. 7B is a side view of an antenna structure according to an embodiment of the invention.

FIG. 7A is a perspective view of an antenna structure 700 according to an embodiment of the invention. FIG. 7B is a side view of the antenna structure 700 according to an embodiment of the invention. Please refer to FIG. 7A and FIG. 7B together. FIG. 7A and FIG. 7B are similar to FIG. 5. In the embodiment of FIG. 7A and FIG. 7B, the antenna structure 700 includes a first radiation element 710, a second radiation element 720, a third radiation element 730, a fourth radiation element 740, an inductor LR, a dielectric substrate 170, and one or more conductive via elements 747 and 748. The first radiation element 710, the second radiation element 720, the third radiation element 730, the fourth radiation element 740, and the conductive via elements 747 and 748 may all be made of metal materials.

Specifically, the dielectric substrate 170 has a first surface E1 and a second surface E2 which are opposite to each other. The first radiation element 710, the second radiation element 720, the third radiation element 730, and the inductor LR are all disposed on the first surface E1 of the dielectric substrate 170. The fourth radiation element 740 is disposed on the second surface E2 of the dielectric substrate 170. The first radiation element 710 has a first feeding point FP1. The second radiation element 720 has a second feeding point FP2. The third radiation element 730 is coupled through the inductor LR to the second radiation element 720.

The length L6 of the fourth radiation element 740 may be longer than the length L5 of the third radiation element 730. For example, the third radiation element 730 may have a vertical projection on the second surface E2 of the dielectric substrate 170, and the vertical projection may at least partially overlap the fourth radiation element 740. The conductive via elements 747 and 748 may be disposed adjacent to the inductor LR. Furthermore, the conductive via elements 747 and 748 penetrate the dielectric substrate 170. The fourth radiation element 740 is coupled through the conductive via elements 747 and 748 to the third radiation element 730. It should be understood that the total number of conductive via elements 747 and 748, and the arrangement thereof, may be adjusted to meet specific requirements.

In the embodiment of FIG. 7A and FIG. 7B, the antenna structure 700 can also cover the first frequency band FB1, the second frequency band FB2, and the third frequency band FB3 as mentioned above. According to practical measurements, the incorporation of the fourth radiation element 740 and the conductive via elements 747 and 748 can help to increase the operational bandwidth of the antenna structure 700. In addition, the total length (L4+L6) of the second radiation element 720 and the fourth radiation element 740 may be substantially equal to 0.25 wavelength (V4) of the first frequency band FB1 of the antenna structure 700. Other features of the antenna structure 700 of FIG. 7A and FIG. 7B are similar to those of the antenna structure 500 of FIG. 5. Accordingly, the two embodiments can achieve similar levels of performance.

Figure 8:
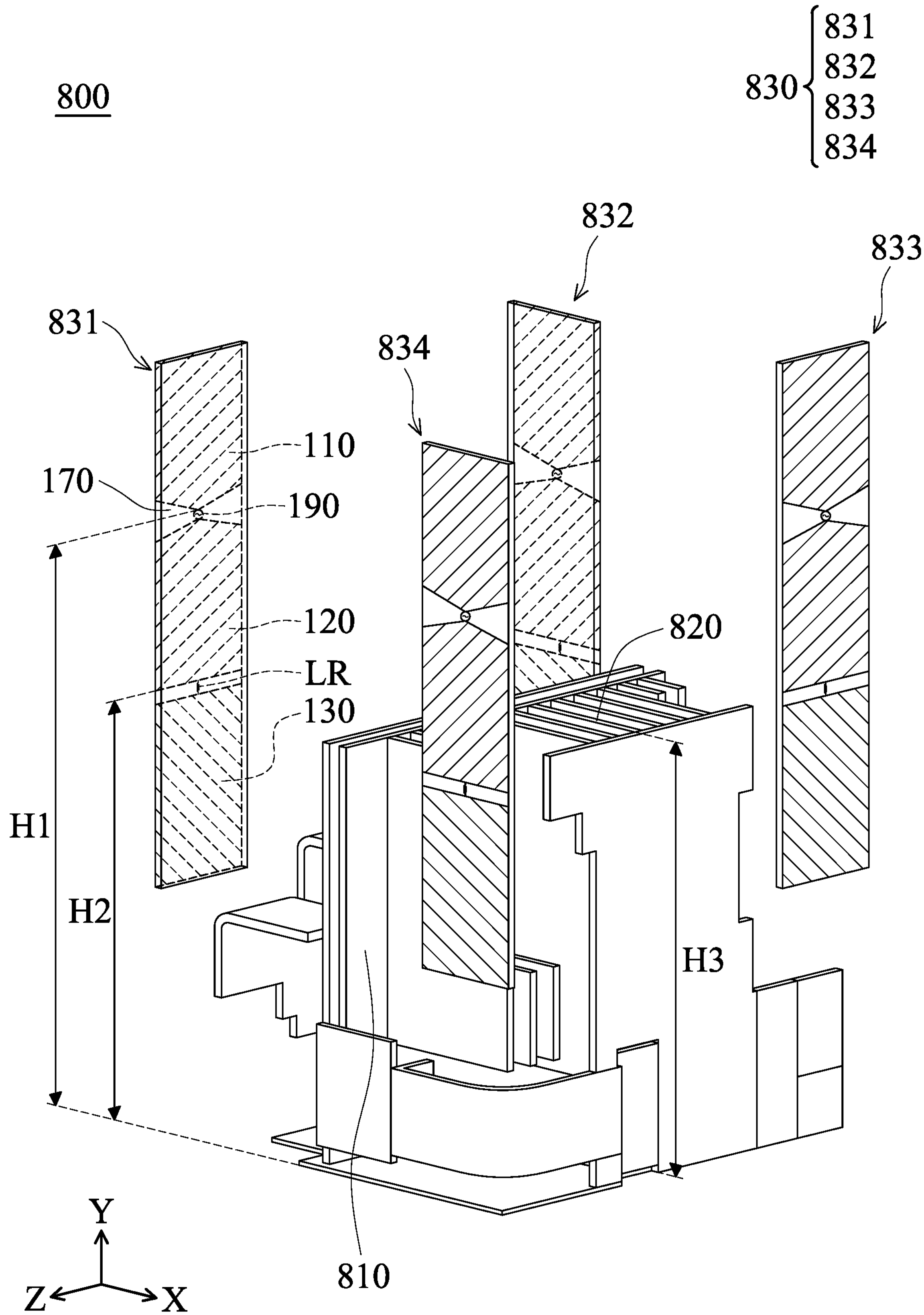
FIG. 8 is a perspective view of a communication device according to an embodiment of the invention.

FIG. 8 is a perspective view of a communication device 800 according to an embodiment of the invention. For example, the communication device 800 may be implemented with a wireless access point or a small base station. In the embodiment of FIG. 8, the communication device 800 includes a motherboard 810, a cooling fin 820, and an antenna system 830. The cooling fin 820 is coupled to the motherboard 810. The antenna system 830 includes a plurality of antenna structures 831, 832, 833 and 834. The motherboard 810 and the cooling fin 820 are substantially surrounded by the antenna structures 831, 832, 833 and 834. The antenna structures 831, 832, 833 and 834 may be arranged toward different directions, such that the antenna system 830 can provide an almost omnidirectional radiation pattern. The structure of each of the antenna structures 831, 832, 833 and 834 has been described in any of the embodiments of FIGS. 1 to 7, and it will not be illustrated again herein. It should be noted that the disposition height H1 of the first radiation element 110 and the disposition height H2 of the second radiation element 120 of each of the antenna structures 831, 832, 833 and 834 are higher than the maximum heights H3 of the motherboard 810 and the cooling fin 820 (e.g., each of the aforementioned heights may be defined along the direction of Y-axis). According to practical measurements, such a design of different heights can help to reduce the interferences from the motherboard 810 and the cooling fin 820, and it can also enhance the whole omnidirectional characteristics of the antenna system 830, especially for the second frequency band FB2 and the third frequency band FB3. Therefore, the communication device 800 can support at least the wideband operations of 4×4 MIMO (Multi-Input and Multi-Output). In alternative embodiments, the antenna system 800 may have fewer antenna structures, or more of them, depending on the requirements.

The invention proposes a novel antenna structure and a novel communication device. In comparison to the conventional design, the invention has at least the advantages of wide bandwidth, omnidirectional radiation pattern, high communication quality, and low manufacturing cost. Therefore, the invention is suitable for application in a variety of devices.

Note that the above element sizes, element shapes, element parameters, and frequency ranges are not limitations of the invention. An antenna designer can fine-tune these settings or values in order to meet specific requirements. It should be understood that the antenna structure and the communication device of the invention are not limited to the configurations depicted in FIGS. 1-8. The invention may merely include any one or more features of any one or more embodiments of FIGS. 1-8. In other words, not all of the features displayed in the figures should be implemented in the antenna structure and the communication device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An antenna structure, comprising:

a first radiation element, having a first feeding point;

a second radiation element, having a second feeding point, wherein the second radiation element is adjacent to the first radiation element;

an inductor;

a third radiation element, coupled through the inductor to the second radiation element; and a dielectric substrate, wherein the first radiation element, the second radiation element, and the third radiation element are disposed on the dielectric substrate;

wherein the first feeding point is coupled to a positive electrode of a signal source, and the second feeding point is coupled to a negative electrode of the signal source;

wherein the first radiation element, the second radiation element, and the third radiation element are excited to generate a first frequency band:

wherein the first radiation element and the second radiation element are excited to generate a second frequency band and a third frequency band;

wherein the second frequency band is higher than the first frequency band, and wherein the third frequency band is higher than the second frequency band.

2. The antenna structure as claimed in claim 1, wherein any of the first radiation element, the second radiation element, and the third radiation element substantially has a rectangular shape, a pentagonal shape, or a hexagonal shape.

3. The antenna structure as claimed in claim 1, wherein the first frequency band is from 746 MHz to 894 MHz, the second frequency band is from 1710 MHz to 2200 MHz, and the third frequency band is from 3300 MHz to 4200 MHz.

4. The antenna structure as claimed in claim 1, wherein the antenna structure provides an almost omnidirectional radiation pattern within the first frequency band, the second frequency band, and the third frequency band.

5. The antenna structure as claimed in claim 1, wherein a length of the first radiation element is substantially equal to 0.25 wavelength of the second frequency band.

6. The antenna structure as claimed in claim 1, wherein a length of the second radiation element is substantially equal to 0.25 wavelength of the second frequency band.

7. The antenna structure as claimed in claim 1, wherein a total length of the second radiation element and the third radiation element is substantially equal to 0.25 wavelength of the first frequency band.

8. The antenna structure as claimed in claim 1, wherein the inductor is considered as a short-circuited element within the first frequency band, and wherein the inductor is considered as an open-circuited element within the second frequency band and the third frequency band.

9. The antenna structure as claimed in claim 1, wherein an inductance of the inductor is from 4 nH to 6 nH.

10. The antenna structure as claimed in claim 1, wherein the inductor is a lumped inductor or a choke line inductor.

11. The antenna structure as claimed in claim 1, wherein the dielectric substrate has a first surface and a second surface opposite to each other, and wherein the first radiation element, the second radiation element, and the third radiation element are disposed on the first surface of the dielectric substrate.

12. An antenna structure, comprising:

a first radiation element, having a first feeding point;

a second radiation element, having a second feeding point, wherein the second radiation element is adjacent to the first radiation element;

an inductor;

a third radiation element, coupled through the inductor to the second radiation element;

a dielectric substrate, wherein the first radiation element, the second radiation element, and the third radiation element are disposed on the dielectric substrate;

a first extension radiation element, coupled to one side of the third radiation element; and a second extension radiation element, coupled to an opposite side of the third radiation element, wherein the second extension radiation element is substantially parallel to the first extension radiation element.

13. The antenna structure as claimed in claim 12, wherein the first extension radiation element and the second extension radiation element are substantially perpendicular to the dielectric substrate.

14. The antenna structure as claimed in claim 11, further comprising:

a fourth radiation element, disposed on the second surface of the dielectric substrate; and one or more conductive via elements, penetrating the dielectric substrate, wherein the fourth radiation element is coupled through the conductive via elements to the third radiation element.

15. The antenna structure as claimed in claim 14, wherein a length of the fourth radiation element is longer than that of the third radiation element.

16. The antenna structure as claimed in claim 14, wherein a total length of the second radiation element and the fourth radiation element is substantially equal to 0.25 wavelength of the first frequency band.

17. A communication device, comprising:

a motherboard;

a cooling fin, coupled to the motherboard; and an antenna system, comprising a plurality of antenna structures, wherein the motherboard and the cooling fin are substantially surrounded by the antenna structures, and wherein each of the antenna structures comprises:

a first radiation element, having a first feeding point;

a second radiation element, having a second feeding point, wherein the second radiation element is adjacent to the first radiation element;

an inductor;

a third radiation element, coupled through the inductor to the second radiation element; and a dielectric substrate, wherein the first radiation element, the second radiation element, and the third radiation element are disposed on the dielectric substrate.

18. The communication device as claimed in claim 17, wherein the communication device is implemented with a wireless access point or a small base station.

19. The communication device as claimed in claim 17, wherein disposition heights of the first radiation element and the second radiation element of each of the antenna structures are higher than maximum heights of the motherboard and the cooling fin.

* * * * *